United States Patent
Soryal et al.

(10) Patent No.: US 11,595,403 B2
(45) Date of Patent: Feb. 28, 2023

(54) CONDITIONAL TEMPORARY AUTHENTICATION FOR THIRD PARTY NODES

(71) Applicant: AT&T Intellectual Property I, L.P., Atlanta, GA (US)

(72) Inventors: Joseph Soryal, Ridgewood, NY (US); Naila Jaoude, Eatontown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 325 days.

(21) Appl. No.: 16/710,313

(22) Filed: Dec. 11, 2019

(65) Prior Publication Data

US 2021/0185053 A1   Jun. 17, 2021

(51) Int. Cl.
*H04L 9/40* (2022.01)
*H04L 9/08* (2006.01)

(52) U.S. Cl.
CPC .......... *H04L 63/108* (2013.01); *H04L 9/0861* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 2011/0060919 A1* | 3/2011 | Smith | H04N 21/4627 713/189 |
| 2020/0076827 A1* | 3/2020 | Gluck | H04L 9/3239 |
| 2020/0314644 A1* | 10/2020 | Dean | G06F 21/62 |
| 2021/0385653 A1* | 12/2021 | Sau | H04W 12/08 |

OTHER PUBLICATIONS

Zhao, Identity-Concealed Authenticated Encryption and Key Exchange, 2016, CCS'16: Proceedings of the 2016 ACM SIGSAC Conference on Computer and Communications Security, pp. 1464-1479 (Year: 2016).*

Srinivas et al.,Jul. 2019. Tree based node verification key management scheme for wireless sensor networks. In 2019 International Conference on Communication and Electronics Systems (ICCES) (pp. 1076-1081). IEEE. (Year: 2019).*

* cited by examiner

*Primary Examiner* — Luu T Pham
*Assistant Examiner* — Edward X Long
(74) *Attorney, Agent, or Firm* — Hartman & Citrin LLC

(57) ABSTRACT

The concepts and technologies disclosed herein are directed to conditional temporary authentication for third party nodes. According to one aspect of the concepts and technologies disclosed herein, a first node of a plurality of nodes can provide a master authentication key to a second node of the plurality of nodes. The first node can receive, from a third node of the plurality of nodes, a temporary child authentication key derived from the master authentication by the second node. The first node can process the temporary child authentication key to determine which portion of a resource to allow the third node to access. The first node can provide the third node access to the portion of the resource.

20 Claims, 9 Drawing Sheets

CONDITIONAL TEMPORARY AUTHENTICATION FOR THIRD PARTY NODES

BACKGROUND

Single sign-on technologies enable users to securely authenticate with multiple applications and/or websites using a single set of authentication credentials (e.g., a username and password). The proliferation of Internet ecosystems, including Internet-based email and productivity ecosystems such as those available from GOOGLE, and social media ecosystems available from FACEBOOK, have made available single-sign on technologies to a vast majority of Internet users. For example, a FACEBOOK user may use their FACEBOOK credentials to create a new account with a third party for the use of an application (e.g., a smartphone app), an e-commerce account, a website user account, or any number of other Internet-related services. The convenience of this feature often overshadows the potential security risks. This may lead to a user agreeing to grant more access than necessary.

SUMMARY

Concepts and technologies disclosed herein are directed to conditional temporary authentication for third party nodes. According to one aspect of the concepts and technologies disclosed herein, a first node of a plurality of nodes can provide a master authentication key to a second node of the plurality of nodes. In some embodiments, the second node can authenticate with the first node prior to the first node providing the master authentication key to the second node. The first node can receive, from a third node of the plurality of nodes, a temporary child authentication key. The second node can derive the temporary child authentication key from the master authentication key. The first node can process the temporary child authentication key to determine which portion of a resource to allow the third node to access. The first node can provide the third node access to the portion of the resource. The second node can derive the temporary child authentication key from the master authentication key using a child key function. The child key function can be shared between the first node and the second node after the first node and the second node are authenticated to each other.

The master authentication key can include a main key field and a temporary key field. The main key field can include a main key string. The temporary key field can contain one or more child key values. The second node can derive the temporary child authentication key from the master authentication key using the contents of the temporary key field. The second node can select a child key value from the temporary key field of the master authentication key to create a temporary child authentication key such that a particular child key value is used only once to create one temporary child authentication key.

The temporary child authentication key can include a prefix and an output. The prefix can identify the temporary child authentication key to the first node. The first node can determine, based upon the prefix of the temporary child authentication key, that the second node provided the temporary child authentication key to the third node. The first node, in turn, can process the temporary child authentication key to determine the portion of the resource to allow the third node to access, at least in part, by reversing the child key function to determine the portion of the resource to allow the third node to access.

In some embodiments, the resource is or includes a hardware resource, a software resource, or a combination of hardware and software resources. The first node can divide a resource into a plurality of sectors in a process referred to herein as "sectorization." In some embodiments, the first node utilizes input received from one or more users such as to define, at least in part, the boundaries of a given sector. In other embodiments, the first node utilizes machine learning techniques to monitor previous sectorization processes and develop one or more machine learning algorithms used to determine how the resource should be sectorized. Recommendations provided by a machine learning algorithm can be accepted, rejected, or modified by the user(s) to finalize the sectorization of the resource.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
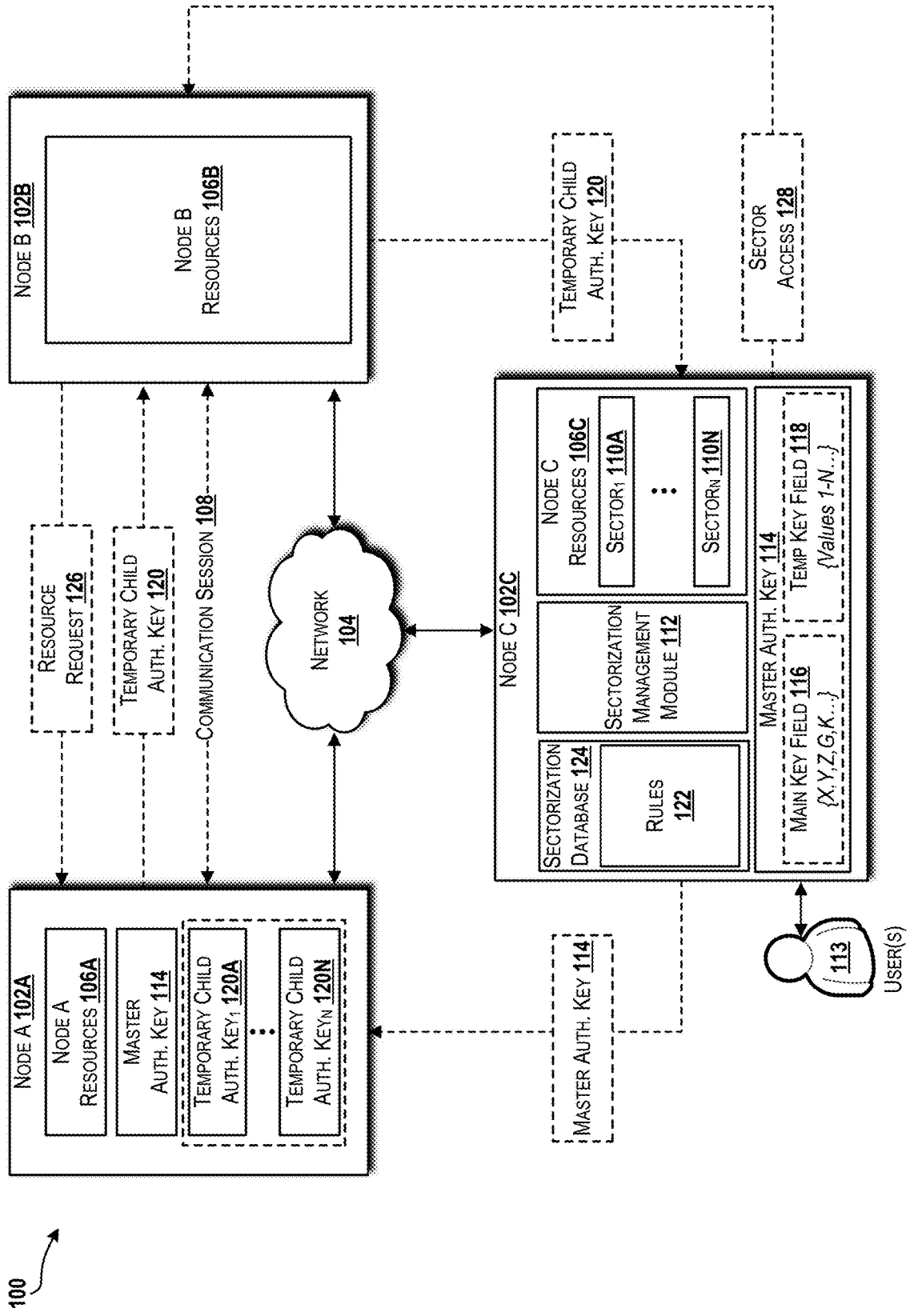
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for venue seat assignment based upon hearing profiles will be described.

Referring now to FIG. 1, aspects of an illustrative operating environment 100 for various concepts disclosed herein will be described. It should be understood that the operating environment 100 and the various components thereof have been greatly simplified for purposes of description. Accordingly, additional or alternative components of the operating environment 100 can be made available without departing from the embodiments described herein.

The illustrated operating environment 100 includes a plurality of nodes 102A-102C (hereinafter, at times, referred to individually as "a node 102," or collectively as "nodes 102"), each operating on or in communication with a network 104. Although three nodes 102 are illustrated, the concepts and technologies disclosed herein are applicable to more than three nodes 102. Each of the nodes 102 can be or can include hardware, software, or a combination of hardware and software. For purposes of explanation, and not limitation, the nodes 102 will be described as three distinct computing systems, each including hardware and software components, some examples of which include personal computers, smartphones, tablets, network nodes, servers, cloud-based systems, or any combinations thereof. Those skilled in the art will appreciate the applicability of the concepts and technologies disclosed herein to any type of device, system, network component, or other hardware/software construct. As such, the illustrative examples provided herein should not be construed as being limiting in any way. Exemplary embodiments of the nodes 102 are illustrated and described herein with reference to FIG. 5 (computer system) and FIG. 6 (mobile device such as a smartphone).

According to various embodiments, the functionality of the nodes 102 can be provided by one or more mobile telephones, smartphones, tablet computers, slate computers, smart watches, fitness devices, smart glasses, other wearable devices, mobile media playback devices, set top devices, navigation devices, laptop computers, notebook computers, ultrabook computers, netbook computers, server computers, computers of other form factors, computing devices of other form factors, other computing systems, other computing devices, Internet of Things ("IoT") devices, other unmanaged devices, other managed devices, and/or the like. It should be understood that the functionality of the nodes 102 can be provided by a single device, by two or more similar devices, and/or by two or more dissimilar devices.

The network 104 can encompass any and all networks used to enable communications among the nodes 102. As such, the network 104 can include any combination of access networks, mobile communications networks (e.g., a cellular network), IP networks, and the Internet, for example. An exemplary embodiment of the network 104 is illustrated and described herein with reference to FIG. 10.

Each of the illustrated nodes 102 includes node resources 106A-106C (hereinafter, at times, referred to individually as "a node resource 106," or collectively as "node resources 106"). In particular, node A 102A includes node A resources 106A, node B 102B includes node B resources 106B, and node C 102C includes node C resources 106C. The node resources 106 can include hardware resources, software resources, or a combination of hardware and software resources. If the node resources 106 include hardware, for example, the node resources 106 might include processing hardware component(s), memory hardware component(s), storage hardware components, I/O hardware components, other hardware constructs, combinations thereof, and/or the like. If the node resources 106 include software, for example, the node resources 106 might include files, folders, directories, functionality, applications, other software constructs, combinations thereof, and/or the like. The node resources 106 are not limited to any specific type of resource—hardware, software, or otherwise—and can include other aspects of the nodes 102. For example, the node resources 106 can be or can include any aspect of one node, such as the node C 102C, that can be accessed by the node A 102A and/or the node B 102B in accordance with the concepts and technologies disclosed herein.

In the illustrated embodiment, the node A 102A is in communication with the node B 102B via a communications session 108 facilitated, at least in part, by the network 104. The node A 102A can direct the node B 102B to access one or more files stored by the node C 102C as part of the node C resources 106C. The node A 102A and the node C 102C can both be active nodes that are authenticated with each other to share their respective node resources 106A, 106C. The node B 102B, however, does not have access to the node C resources 106C. In accordance with the concepts and technologies disclosed herein, the node A 102A can provide the node B 102B with temporary access to one or more files stored by the node C 102C as part of the node C resources 106C. Moreover, this access can be further defined by temporal conditions (e.g., 10 minute or 1 day access time), geographical conditions (e.g., only when node B 102B and/or node C 102C is/are within a specific geographical location), and/or other conditions.

The node C resources 106C of the node C 102C are illustrated as being divided into a plurality of sectors 110A-110N (hereinafter, at times, referred to individually as "a sector 110," or collectively as "sectors 110"). The concept of dividing the node resources 106 into sectors is referred to herein as "sectorization." The node C 102C is configured to execute a software module, shown as a sectorization management module 112, to discover the node C resources 106C and to sectorize the node C resources 106C into the sectors 110. In some embodiments, the sectorization management module 112 utilizes input received from one or more users 113 such as to define, at least in part, the boundaries of a given sector 110. In other embodiments, the sectorization management module 112 utilizes machine learning techniques to monitor previous sectorization processes and develop one or more machine learning algorithms used to determine how a given set of node resources 106 should be sectorized. Recommendations provided by a machine learning algorithm can be accepted, rejected, or modified by the user(s) 114 to finalize the sectorization of the given set of node resources 106. An example machine learning system that can be used to implement such recommendations is illustrated and described below with reference to FIG. 9.

The node C 102C also includes a master authentication key 114 that can be shared with other nodes, such as the node A 102A in the illustrated example. The master authentication key 114 includes a main key field 116 and a temporary key field 118. The main key field 116 can store a string of data associated with the master authentication key 114. As generally known by those skilled in the art, a "key" is a piece of information applied utilizing an algorithm to a string or block of unencrypted information (such as a "seed") to produce encrypted information, or to decrypt encrypted information. The string of data contained in the main key field 116 can be used by the node C 102C and the node A 102A for authentication, during which the temporary key field 118 is ignored. The temporary key field 118 can store a number of individual child key values (e.g., 10 values). The node A 102A can create/generate/derive one or more temporary child authentication keys 120A-120N from the master authentication key 114 using the contents of the temporary key field 118. The node A 102A can select a child key value from the temporary key field 118 of the master authentication key 114 to create a temporary child authentication key 120 such that a particular child key value is used only once to create one temporary child authentication key 120. In the illustrated example, the temporary key field 118 includes values 1-N, which correspond to the temporary child authentication keys 120A-120N that can be created by the node A 102A. The node C 102C will only accept one temporary child authentication key 120 created from a particular child key value included in the temporary key field 118. The child key values in the temporary key field 118 can be replenished each time the node A 102A and the node C 102C authenticate to each other.

In some embodiments, the sectorization management module 112 can learn, over time, the approximate time duration, the identity of the entity or entities that request access to a given one or more of the sectors 110, and/or other information that can be used to customize a given child key. This information can be established in a set of one or more rules 122 stored in a sectorization database 124. The sectorization management module 112 can utilize the rule(s) 122 from the sectorization database 124 to know what temporary child authentication keys 120 can be generated from the master authentication key 114. Moreover, the rule(s) 122 can be used to define privileges of each of the temporary child authentication keys 120 in terms of what can be accessed (i.e., which of the sectors 110) and for how long. Those skilled in the art will appreciate other privileges that may be defined based upon the rule(s) 122 to accommodate the circumstances of any given implementation. As such, what can be accessed and for how long should be construed as exemplary examples of privileges, and should not be construed as being limiting in any way.

For file systems (e.g., server, computer, hard drive, network storage system, etc.), the sectorization management module 112 can scan the storage and can sectorize it based on the folders and files. Thus, each folder and file may have its own temporary child authentication key 120. The sectorization management module 112 can continuously monitor usage and can adjust the time duration for granting access to a particular folder/file. The sectorization management module 112, in this case, can provide three levels of privileges: Read-Only, Write-Only, and Read and Write. Each privilege level for a certain file access can have its own unique temporary child authentication key 120 that defines the access duration as well. The sectorization management module 112 can have administrator privileges for the system (e.g., node C 102C in the illustrated example) it is running on and can scan for any passwords stored on the system for these files and folders. The password(s) can be stored in the sectorization database 124. If a password is not available, the sectorization management module 112 can request the user 113 (e.g., a system administrator) via a message, pop-up window, and/or the like. The user 113 can then provide the requested password(s) to the sectorization database 124.

For online applications (e.g., social media accounts, email, and the like), many of which rely, at least in part, upon one or more application programming interfaces ("APIs"), the sectorization management module 112 can provide privileges based upon an API level where each API has a different functionality. For example, a social media website such as FACEBOOK may use one API to post pictures and another API to send chat messages. The service provider (e.g., a website administrator) can provide different passwords to each API. A more detailed example will now be described. Suppose the user 113 has the sectorization management module 112 running on their laptop computer (e.g., the node C 102C implemented as a laptop computer) and the user 113 is logged in to his or her social media account, and a third party (e.g., an online service that posts daily quotes to the user's 113 social media account) asks the user 113 for his or her social media account credentials to access the user's 113 social media account. Today, the user 113 would provide a username and password to the third party, who would then have free reign to the user's social media account. By implementing the concepts and technologies disclosed herein, the sectorization management module 112 monitors this transaction and knows the API(s) for the user's 113 social media account (e.g., from past experience or via communication between the social media provider and a centralized sectorization management system) and the functionalities thereof. The sectorization management module 112 may understand the purpose for the third party (via text processing from the third party on the screen or via asking the user 113 directly, what is the purpose to prove the credential to this third party), then the sectorization management module 112 can automatically provide the specific API password with an estimated duration of use.

For hardware systems (e.g., server, computer, system such as vehicle or machine, and the like), the sectorization management module 112 can scan the hardware element (similar to a hardware scan that happens on a computer to check the health of each hardware component such as memory, hard drive sectors, BIOS, network cards, video cards, sound cards, and the like). The sectorization management module 112 may have administrative privileges on the machine the hardware elements are installed on, and will have access to the BIOS, motherboards, control unit, and the like. The sectorization management module 112 can attempt to access these hardware elements, and if it does not find a password, the sectorization management module 112 can ask the user 113 via a message, pop-up window, and/or the like. The user 113 can provide those passwords to the sectorization database 124 in order for the system to run properly. For example, in home automation, there is often a home controller that controls all Internet of Things ("IoT") devices and intelligent home appliances. In this example, the sectorization management module 112 can reside in the home controller and can scan the home controller until it finds the controller's database that includes all of the IoT devices controlled by the home controller. The sectorization management module 112 can create the temporary child authentication key 120 for each IoT device or appliance, and can consult the homeowner for these sectorizations/choices. The homeowner can add IoT devices or delete the intelligent automated choices made.

The temporary child authentication key 120 is created from the master authentication key 114 based upon a selected value from the temporary key field 118 and a selected portion of the master authentication key 114 that corresponds to the location of the selected value from the temporary key field 118. Additional details regarding how the temporary child authentication key 120 can be created will be described below.

In the illustrated embodiment, the node B 102B generates and sends a resource request 126 to the node A 102A. For ease of explanation, the resource request 126 may contain a request for a specific file stored by the node C 102C as part of the node C resources 106C. Moreover, the specific file may be associated with a first sector 110A created by the sectorization management module 112 of the node C 102C. Since node A 102A does not have the specific file stored as part of the node A resources 106A, the node A 102A can generate, using the master authentication key 114, a temporary child authentication key 120 using the child key value in the temporary key field 118 that corresponds to the specific file. The node A 102A can send the temporary child authentication key 120 to the node B 102B over the network 104 via the communications session 108. The node B 102B, in turn, can provide the temporary child authentication key 120 to the node C 102C. The node C 102C can receive the temporary child authentication key 120 and access the sectorization database 124 to determine where the specific file is located (i.e., which sector—the first sector 110A in this simplified example). The node C 102C can then respond to the node B 102B with sector access (generally shown as 128). The sector access 128 may include the specific file with an expiration date as determined based upon the rules 122. Alternatively, the sector access 128 will allow the node B 102B to remotely access the specific file from the node C resources 106C for a specified period of time. The node B 102B may be provided the sector access 128 in a different way than described herein. Those skilled in the art will appreciate the applicability of the concepts disclosed herein to other ways in which the first sector 110A can be accessed.

The example of the node A 102A providing the node B 102B access to one or more of the sectors 110 of the node C resources 106C, wherein the sectors 110 are embodied as individual files, is one non-limiting example of how the concepts and technologies disclosed herein can be used. Other use cases will now be described. These use cases are exemplary, and therefore should not be construed as being limiting in any way.

Social media platforms (e.g., FACEBOOK, INSTAGRAM, and TWITTER) and applications (e.g., IOS and ANDROID smartphone applications) often ask users for their usernames and passwords. The concepts and technologies disclosed herein allow users to grant such platforms/applications very specific usage permissions (e.g., only post daily joke on my timeline and nothing else) and grant no access to other aspects of a user's social media account.

Another use case of the concepts and technologies disclosed herein is for autonomous vehicles. For example, a first vehicle manufactured by a first manufacturer (e.g., embodied as the node A 102A) may temporarily grant access to a second vehicle manufactured by a second manufacturer (e.g., embodied as the node B 102B) so that the second vehicle can access some information to be used by the second vehicle temporarily and that could indirectly benefit the first vehicle.

The concepts and technologies disclosed herein can be applied to smart home applications. For example, a home automation manager (e.g., embodied as the node A 102A) can grant a vendor (e.g., embodied as the node B 102B) temporary access to a part of a household item (e.g., a compressor of refrigerator) for troubleshooting.

Another use case of the concepts and technologies disclosed herein relates to an administrator (e.g., embodied as the node A 102A) who can grant temporary access to a set of machines to access a new processing plan file on a sectorized server (e.g., the node C resources 106C). In this case, the temporary child authentication key 120 pertains only to this new processing plan file.

Figure 2:
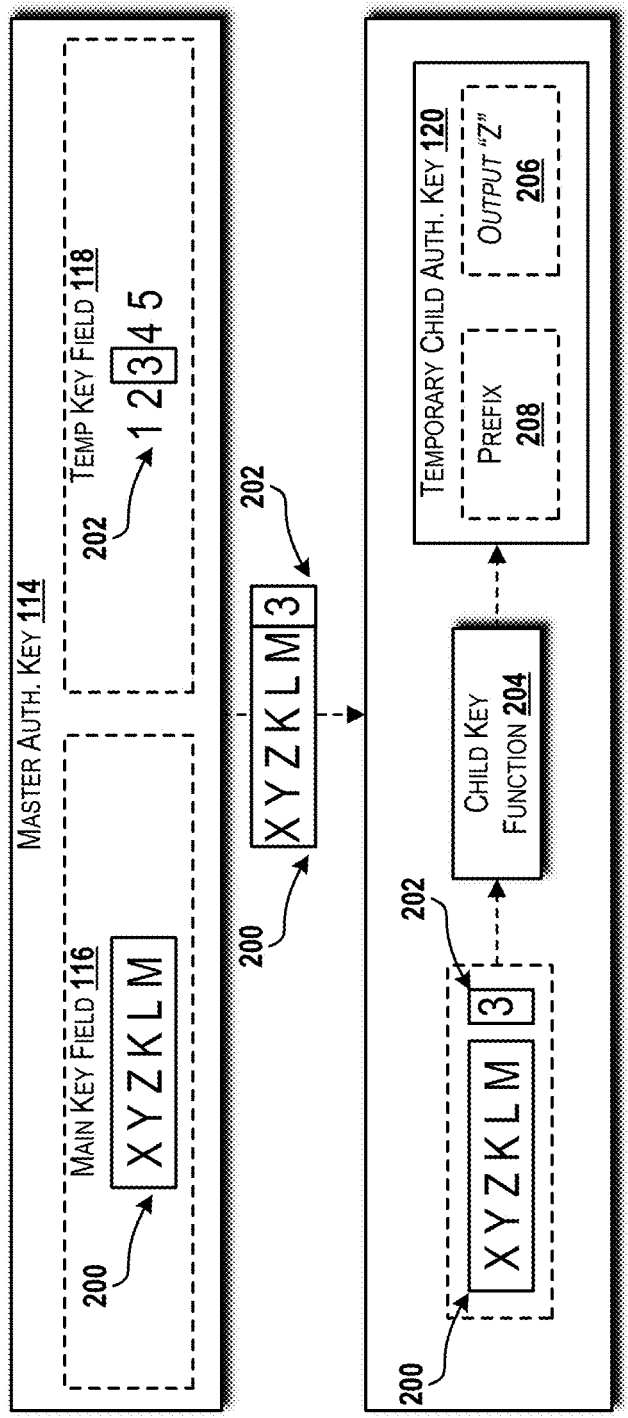
FIG. 2 is a diagram illustrating an example for creating a child authentication key based upon a master authentication key, according to an embodiment of the concepts and technologies disclosed herein.

Turning now to FIG. 2, a diagram illustrating an example for creating a temporary child authentication key 120 based upon a master authentication key 114 will be described, according to an embodiment of the concepts and technologies disclosed herein. The illustrated example shows the master authentication key 114 with the main key field 116 and the temporary key field 118 as introduced above with reference to FIG. 1. The main key field 116 has been populated with a main key string 200—X Y Z K L M. The temporary key field 118 has been populated with child key values 202—1 2 3 4 5.

When the node A 102A and the node C 102C need to authenticate, only the main key string 200 (i.e., X Y Z K L M) is used and the child key values 202 (i.e., 1 2 3 4 5) in the temporary key field 118 are ignored. When node A 102A needs to create the temporary child authentication key 120 (such as in response to the resource request 126), the node A 102A can perform a mathematical operation or function, which is shown as a child key function 204, between the main key string 200 and one of the child key values 202 selected from the temporary key field 118.

In the example illustrated in FIG. 2, the child key value 202 of "3" has been selected. The node A 102A can merge the main key string 200 and the child key value 202 using the child key function 204 to generate an output "Z" 206. To obtain the output "Z," the "3" and the "XYZKLM" can be XORed, ANDed, multiplied, or entered into a two-dimensional polynomial function (represented as the child key function 204), where x is the value for the main key string 200 and y is the value for the child key value 202 such that $Z=x^4+y^5$ [or $Z=(XYZKLM)^4+(3)^5$]. It should be understood that the node A 102A and the node C 102C can agree upon the child key function 204 and later agree to change the child key function 204. The child key function 204 can be changed any number of times.

The temporary child authentication key 120 includes a prefix 208 and the output "Z" 206 (or other output X Y K L or M as the case may be in this example). The node C 102C uses the prefix 208 to know with which master authentication key 114 the temporary child authentication key 120 is associated. When the node C 102C receives the temporary child authentication key 120, the node C 102C recognizes that the temporary child authentication key 120 is from the node A 102A and presented by a third party node (i.e., the node B 102B in this example). The node C 102C also will take the output "Z" 206 and reverse the child key function 204 to extract the original child key value that identifies a specific one or more of the sectors 110 (and any associated temporal, geographical, or other conditions).

In some embodiments, the prefix 208 includes a string of bits exchanged between nodes, such as the node A 102A and node C 102C when the master authentication key 114 is shared. Alternatively, in some other embodiments, the prefix 208 can be derived from the main key field 116 of the master authentication key 114 using another mathematical operation/function agreed upon between the node A 102A and the node C 102C.

Figure 3:
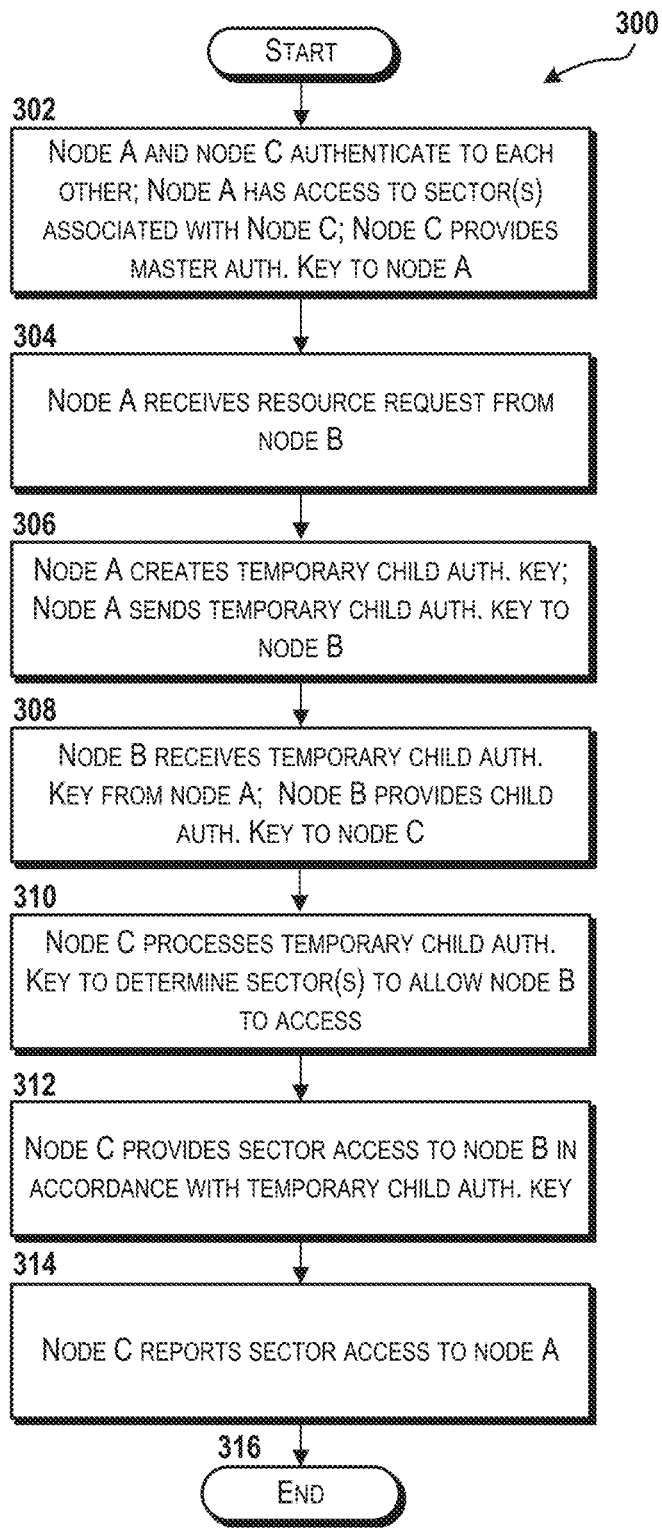
FIG. 3 is a flow diagram illustrating aspects of a method for conditionally and temporarily providing authentication for a third party node, according to an illustrative embodiment.

Turning now to FIG. 3, a flow diagram illustrating aspects of a method 300 for conditionally and temporarily providing authentication for a third party node will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the node A 102A, the node B 102B, the node C 102C, the network 104 or components thereof, and/or one or more other computing systems, network components, and/or devices disclosed herein to perform operations.

For purposes of illustrating and describing some of the concepts of the present disclosure, the methods disclosed herein are described as being performed, at least in part, by the node A 102A, the node B 102B, or the node C 102C, as labeled, via execution, by one or more processing components, of one or more software modules, applications, and/or other software such as the sectorization management module 112, the node resources 106, the child key function 204, or some combination thereof. It should be understood that additional and/or alternative devices can provide the functionality described herein via execution of one or more modules, applications, and/or other software. Thus, the illustrated embodiments are illustrative, and should not be viewed as being limiting in any way.

The method 300 will be described with additional reference to FIG. 1. The method 300 begins and proceeds to operation 302. At operation 302, the node A 102A and the node C 102C authenticate to each other. The node A 102A therefore has access to the sector(s) 110 of the node C resources 106C associated with the node C 102C. The node B 102B, as noted above, does not have access to any of the sectors 110 of the node C resources 106C associated with the node C 102C. The node C 102C provides the master authentication key 114 to the node A 102A.

From operation 302, the method 300 proceeds to operation 304. At operation 304, the node A 102A receives the resource request 126 from the node B 102B. The resource request 126 notifies the node A 102A that the node B 102B would like to access one or more of the sectors 110 of the node C resources 106C associated with the node C 102C.

From operation 304, the method 300 proceeds to operation 306. At operation 306, the node A 102A creates and sends the temporary child authentication key 120 to the node B 102B in response to the resource request 126. The method 300 assumes that the node A 102A grants the node B 102B access to the sector(s) 110 of the node C resources 106C. The node A 102A may instead deny the node B 102B access for any reason.

From operation 306, the method 300 proceeds to operation 308. At operation 308, the node B 102B receives the temporary child authentication key 120 from the node A 102A. The node B 102B then provides the temporary child authentication key 120 to the node C 102C. From operation 308, the method 300 proceeds to operation 310. At operation 310, the node C 102C processes the temporary child authentication key 120 to determine to which of the sector(s) 110 of the node C resources 106C the node B 102B is allowed access.

From operation 310, the method 300 proceeds to operation 312. At operation 312, the node C 102C provides sector access 128 to the node B 102B in accordance with the temporary child authentication key 120. From operation 312, the method 300 proceeds to operation 314. At operation 314, the node C 102C reports the sector access 128 to the node A 102A.

From operation 314, the method 300 proceeds to operation 316. The method 300 can end at operation 316.

Figure 4:
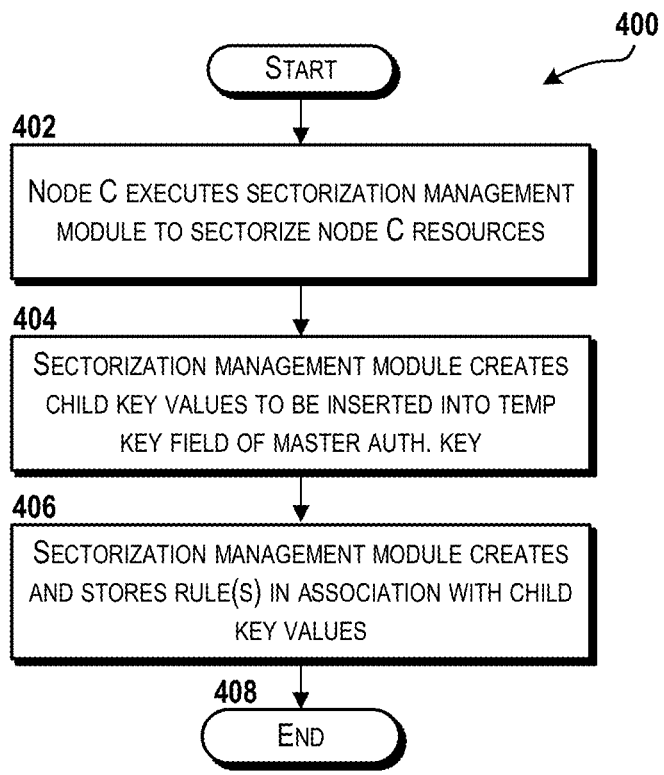
FIG. 4 is a flow diagram illustrating aspects of a method for sectorizing node resources, according to an illustrative embodiment.

Turning now to FIG. 4, a flow diagram illustrating aspects of a method 400 for sectorizing node resources 106 will be described, according to an illustrative embodiment. The method 400 will be described with additional reference to FIGS. 1 and 2. The method 400 begins and proceeds to operation 402. At operation 402, the node C 102C executes the sectorization management module 112 to sectorize the node C resources 106C into the sector(s) 110. In particular, the sectorization management module 112 can obtain the details of the node C 102C. The sectorization process can occur manually via the user(s) 113 (e.g., a system administrator), where the user(s) 113 divides up the node C resources 106C into the sectors 110 and configures the sectorization management module 112 accordingly. Alternatively, the sectorization management module 112 can perform system discovery and sectorization via a machine learning algorithm described below. Moreover, the sectorization management module 112 can implement a hybrid sectorization method where the user(s) 113 uses some or all the machine learning recommendations on how to sectorize the system.

In some embodiments, a centralized system (not shown) can be provided from which the user(s) 113 can download the sectorization management module 112. This centralized system can collect the individual experiences by the downloaded SMs (e.g., with users' permission). For example, if the user 113 downloads the sectorization management module 112 and uses it for his/her server (or other computing system), the final sectorization (generated by the machine learning algorithm and refined/approved by the user 113) can be shared with the centralized system to improve future versions of the sectorization management module 112.

From operation 402, the method 400 proceeds to operation 404. At operation 404, the sectorization management module 112 creates the child key values (best shown as 202 in FIG. 2) to be inserted into the temporary key field 118 of the master authentication key 114. From operation 404, the method 400 proceeds to operation 406. At operation 406, the sectorization management module 112 creates and stores the rule(s) 122 in association with the child key values 202. From operation 406, the method 400 proceeds to operation 408. The method 400 can end at operation 408.

Figure 5:
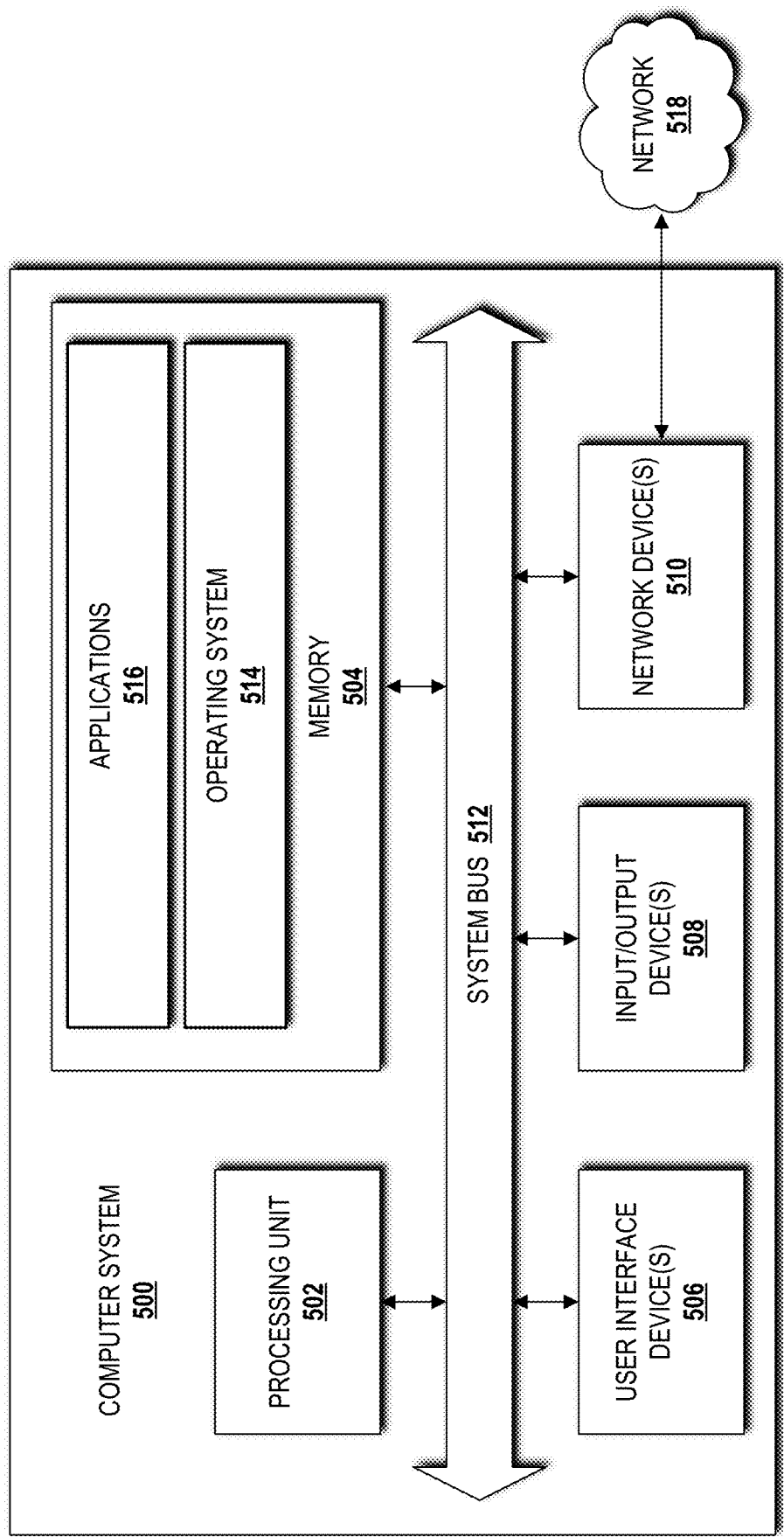
FIG. 5 is a block diagram illustrating an example computer system capable of implementing aspects of the embodiments presented herein.

FIG. 5 is a block diagram illustrating a computer system 500 configured to perform various operations disclosed herein. The computer system 500 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510.

In some embodiments, the node A 102A, the node B 102B, the node C 102C, or some combination thereof is/are configured, at least in part, like the computer system 500. It should be understood, however, that the node A 102A, the node B 102B, or the node C 102C might include additional functionality or include less functionality than now described.

The processing unit 502 might be a standard central processor that performs arithmetic and logical operations, a more specific purpose programmable logic controller ("PLC"), a programmable gate array, or other type of processor known to those skilled in the art and suitable for controlling the operation of the computer system 500. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more applications 516. The operating system 514 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The applications 516 can include the sectorization management module 112, the child key function 204, and/or other applications associated with the nodes 102.

The user interface devices 506 may include one or more devices with which a user accesses the computer system 500. The user interface devices 506 may include, but are not limited to, computers, servers, personal digital assistants, telephones (e.g., cellular, IP, or landline), or any suitable computing devices. The I/O devices 508 enable a user to interface with the program modules. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, a touchscreen, or an electronic stylus. Further, the I/O devices 508 may include one or more output devices, such as, but not limited to, a display screen or a printer. An I/O device 508 embodied as a display screen can be used to present information to the user 113.

The network devices 510 enable the computer system 500 to communicate with a network 518, which can be or can include the network 104. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a WLAN such as a WI-FI network, a WWAN, a wireless PAN ("WPAN") such as BLUETOOTH, or a wireless MAN ("WMAN"). Alternatively, the network 518 may be a wired network such as, but not limited to, a WAN such as the Internet, a LAN such as the Ethernet, a wired PAN, or a wired MAN.

Figure 6:
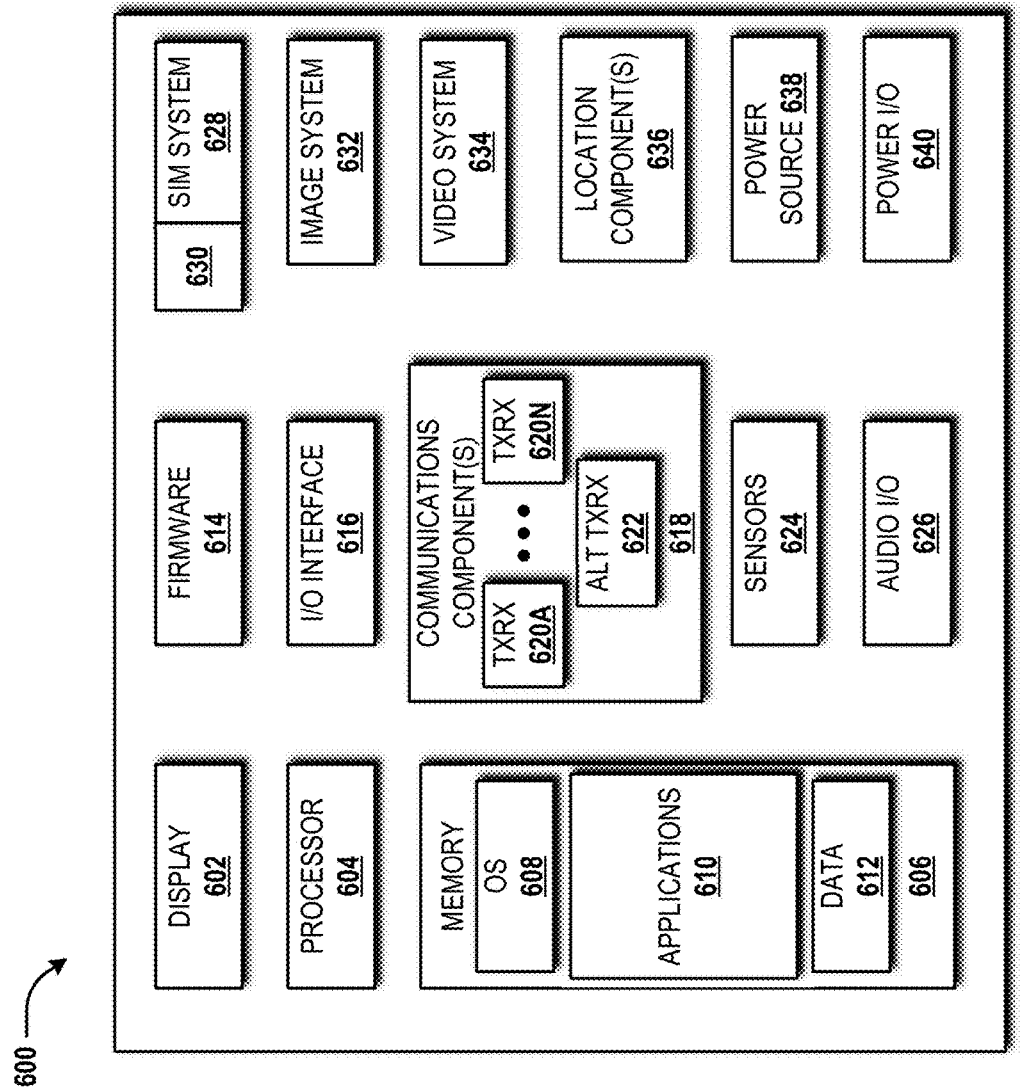
FIG. 6 is a block diagram illustrating an example mobile device capable of implementing aspects of the embodiments disclosed herein.

Turning now to FIG. 6, an illustrative mobile device 600 and components thereof will be described. In some embodiments, the node A 102A, the node B 102B, the node C 102C, or some combination thereof is/are configured, at least in part, like the mobile device 600. It should be understood, however, that the node A 102A, the node B 102B, or the node C 102C might include additional functionality or include less functionality than now described.

While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display the network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. In some embodiments, the applications 610 also can include a UI application (not illustrated in FIG. 6). In some embodiments, the applications 610 can include the sectorization management module 112, the child key function 204, and/or other applications to be executed, at least in part, by the nodes 102.

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in data communications, entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 618 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 500 described above with reference to FIG. 5. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
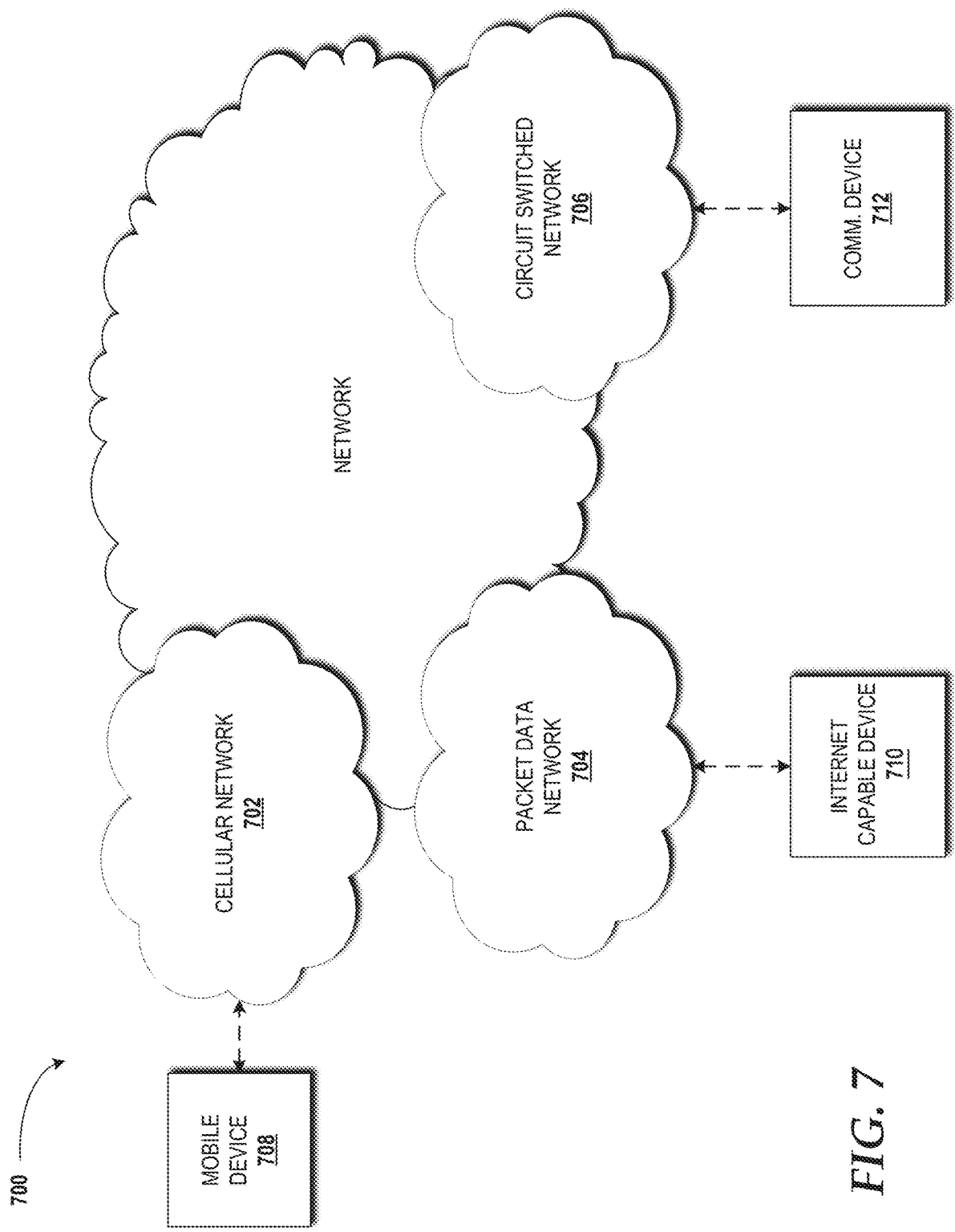
FIG. 7 is a diagram illustrating a network, according to an illustrative embodiment.

Turning now to FIG. 7, details of a network 700 are illustrated, according to an illustrative embodiment. The network 104 (FIG. 1) can be or can include at least a portion of the network 700. The network 700 includes a cellular network 702, a packet data network 704, and a circuit switched network 706 (e.g., a public switched telephone network).

The cellular network 702 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, one or more of the nodes 102, a cellular telephone, a user equipment, a mobile terminal, a PDA, a laptop computer, a handheld computer, and combinations thereof, can be operatively connected to the cellular network 702. The cellular network 702 can be configured as a GSM) network and can provide data communications via GPRS and/or EDGE. Additionally, or alternatively, the cellular network 702 can be configured as a 3G Universal Mobile Telecommunications System ("UMTS") network and can provide data communications via the HSPA protocol family, for example, HSDPA, EUL, and HSPA+. The cellular network 702 also is compatible with 4G mobile communications standards such as LTE, or the like, as well as evolved and future mobile standards.

The packet data network 704 includes various devices, for example, one or more of the nodes 102, other servers, other systems, computers, databases, and other devices in communication with one another, as is generally known. In some embodiments, the packet data network 704 is or includes one or more WI-FI networks, each of which can include one or more WI-FI access points, routers, switches, and other WI-FI network components. The packet data network 704 devices are accessible via one or more network links. The servers often store various files (e.g., as part of the node resources 106) that are provided to a requesting device such as, for example, another one of the nodes 102, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, one or more of the nodes 102, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Figure 8:
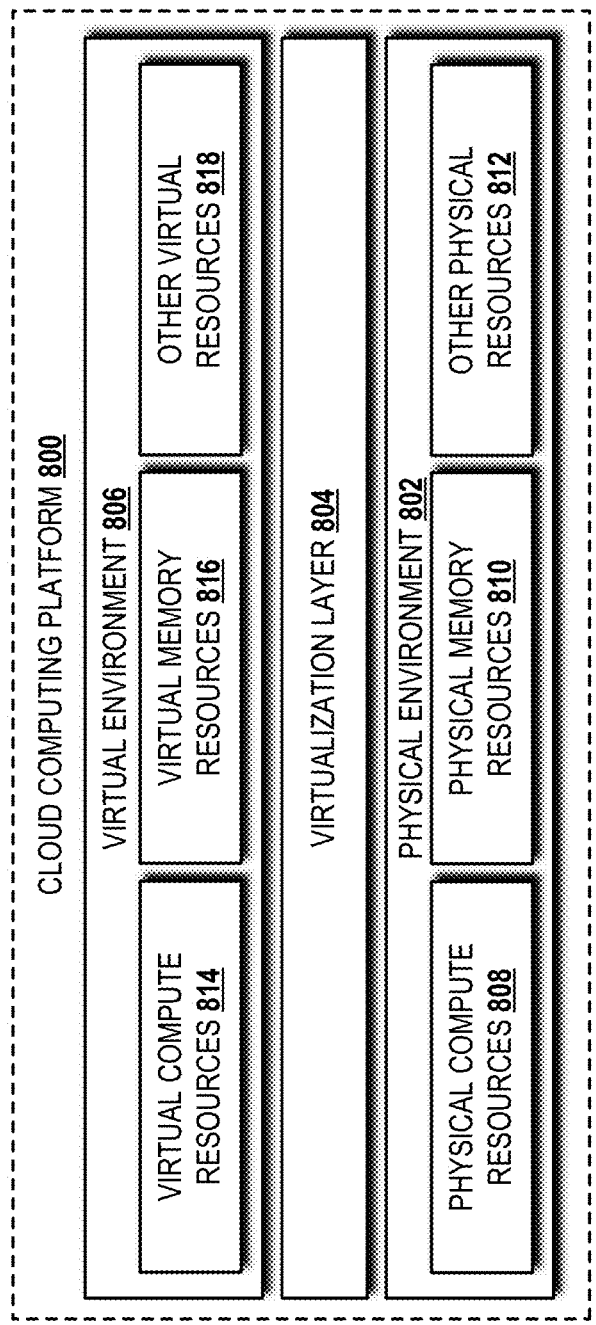
FIG. 8 is a diagram illustrating a cloud computing platform capable of implementing aspects of the embodiments disclosed herein.

Turning now to FIG. 8, an illustrative cloud computing platform 800 will be described, according to an illustrative embodiment. One or more of the nodes 102, and/or other networks, systems, and/or devices disclosed herein can be implemented and/or controlled, at least in part, in/by the cloud platform 800.

The cloud computing platform 800 includes a physical environment 802, a virtualization layer 804, and a virtual environment 806. While no connections are shown in FIG. 8, it should be understood that some, none, or all of the components illustrated in FIG. 8 can be configured to interact with one other to carry out various functions described herein. In some embodiments, the components are arranged so as to communicate via one or more networks. Thus, it should be understood that FIG. 8 and the remaining description are intended to provide a general understanding of a suitable environment in which various aspects of the embodiments described herein can be implemented, and should not be construed as being limiting in any way.

The physical environment 802 provides hardware resources that, in the illustrated embodiment, include one or more physical compute resources 808, one or more physical memory resources 810, and one or more other physical resources 812. The physical compute resource(s) 808 can include one or more hardware components that perform computations to process data and/or to execute computer-executable instructions of one or more application programs, one or more operating systems, and/or other software. The physical compute resources 808 can include one or more central processing units ("CPUs") configured with one or more processing cores. The physical compute resources 808 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 808 can include one or more discrete GPUs. In some other embodiments, the physical compute resources 808 can include CPU and GPU components that are configured in accordance with a co-processing CPU/GPU computing model, wherein the sequential part of an application executes on the CPU and the computationally-intensive part is accelerated by the GPU processing capabilities. The physical compute resources 808 can include one or more system-on-chip ("SoC") components along with one or more other components, including, for example, one or more of the physical memory resources 810, and/or one or more of the other physical resources 812. In some embodiments, the physical compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 808 can be or can include one or more hardware components architected in accordance with an ARM architecture, available for license from ARM HOLDINGS of Cambridge, United Kingdom. Alternatively, the physical compute resources 808 can be or can include one or more hardware components architected in accordance with an x86 architecture, such an architecture available from INTEL CORPORATION of Mountain View, Calif., and others. Those skilled in the art will appreciate the implementation of the physical compute resources 808 can utilize various computation architectures, and as such, the physical compute resources 808 should not be construed as being limited to any particular computation architecture or combination of computation architectures, including those explicitly disclosed herein.

The physical memory resource(s) 810 can include one or more hardware components that perform storage/memory operations, including temporary or permanent storage operations. In some embodiments, the physical memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 808.

The other physical resource(s) 812 can include any other hardware resources that can be utilized by the physical compute resources(s) 808 and/or the physical memory resource(s) 810 to perform operations described herein. The other physical resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 802 can be virtualized by one or more virtual machine monitors (not shown; also known as "hypervisors") operating within the virtualization/control layer 804 to create virtual resources that reside in the virtual environment 806. The virtual machine monitors can be or can include software, firmware, and/or hardware that alone or in combination with other software, firmware, and/or hardware, creates and manages virtual resources operating within the virtual environment 806.

The virtual resources operating within the virtual environment 806 can include abstractions of at least a portion of the physical compute resources 808, the physical memory resources 810, and/or the other physical resources 812, or any combination thereof, shown as virtual compute resources 814, virtual memory resources 816, and other virtual resources 818, respectively. In some embodiments, the abstractions can include one or more virtual machines upon which one or more applications can be executed.

Figure 9:
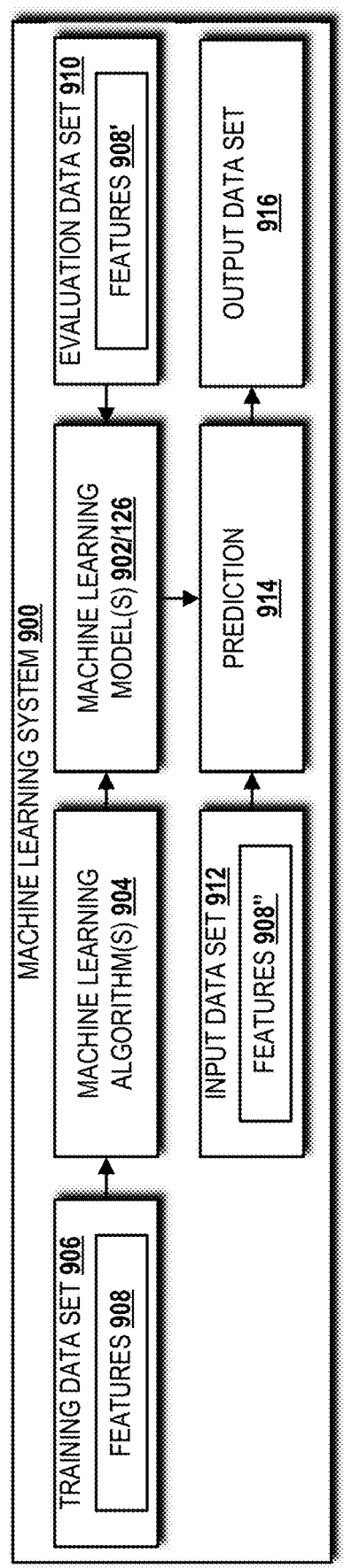
FIG. 9 is a block diagram illustrating a machine learning system capable of implementing aspects of the concepts and technologies disclosed herein.

Turning now to FIG. 9, a machine learning system 900 capable of implementing aspects of the embodiments disclosed herein will be described. In some embodiments, the machine learning system 900 can be implemented as part of the sectorization management module 112. The illustrated machine learning system 900 includes one or more machine learning models 902. The machine learning models 902 can include supervised and/or semi-supervised learning models. The machine learning model(s) 902 can be created by the machine learning system 900 based upon one or more machine learning algorithms 904. The machine learning algorithm(s) 904 can be any existing, well-known algorithm, any proprietary algorithms, or any future machine learning algorithm. Some example machine learning algorithms 904 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 904 based upon the problem(s) to be solved by machine learning via the machine learning system 900.

The machine learning system 900 can control the creation of the machine learning models 902 via one or more training parameters. In some embodiments, the training parameters are selected modelers at the direction of an enterprise, for example. Alternatively, in some embodiments, the training parameters are automatically selected based upon data provided in one or more training data sets 906. The training parameters can include, for example, a learning rate, a model size, a number of training passes, data shuffling, regularization, and/or other training parameters known to those skilled in the art. The training data in the training data sets 906 can be collected from the nodes 102 (and particularly the node resources 106), the sectorization database 124, the sectorization management module 112, input by the user(s) 114, or any combination thereof.

The learning rate is a training parameter defined by a constant value. The learning rate affects the speed at which the machine learning algorithm 904 converges to the optimal weights. The machine learning algorithm 904 can update the weights for every data example included in the training data set 906. The size of an update is controlled by the learning rate. A learning rate that is too high might prevent the machine learning algorithm 904 from converging to the optimal weights. A learning rate that is too low might result in the machine learning algorithm 904 requiring multiple training passes to converge to the optimal weights.

The model size is regulated by the number of input features ("features") 908 in the training data set 906. A greater the number of features 908 yields a greater number of possible patterns that can be determined from the training data set 906. The model size should be selected to balance the resources (e.g., compute, memory, storage, etc.) needed for training and the predictive power of the resultant machine learning model 902.

The number of training passes indicates the number of training passes that the machine learning algorithm 904 makes over the training data set 906 during the training process. The number of training passes can be adjusted based, for example, on the size of the training data set 906, with larger training data sets being exposed to fewer training passes in consideration of time and/or resource utilization. The effectiveness of the resultant machine learning model 902 can be increased by multiple training passes.

Data shuffling is a training parameter designed to prevent the machine learning algorithm 904 from reaching false optimal weights due to the order in which data contained in the training data set 906 is processed. For example, data provided in rows and columns might be analyzed first row, second row, third row, etc., and thus an optimal weight might be obtained well before a full range of data has been considered. By data shuffling, the data contained in the training data set 906 can be analyzed more thoroughly and mitigate bias in the resultant machine learning model 902.

Regularization is a training parameter that helps to prevent the machine learning model 902 from memorizing training data from the training data set 906. In other words, the machine learning model 902 fits the training data set 906, but the predictive performance of the machine learning model 902 is not acceptable. Regularization helps the machine learning system 900 avoid this overfitting/memorization problem by adjusting extreme weight values of the features 908. For example, a feature that has a small weight value relative to the weight values of the other features in the training data set 906 can be adjusted to zero.

The machine learning system 900 can determine model accuracy after training by using one or more evaluation data sets 910 containing the same features 908' as the features 908 in the training data set 906. This also prevents the machine learning model 902 from simply memorizing the data contained in the training data set 906. The number of evaluation passes made by the machine learning system 900 can be regulated by a target model accuracy that, when reached, ends the evaluation process and the machine learning model 902 is considered ready for deployment.

After deployment, the machine learning model 902 can perform a prediction operation ("prediction") 914 with an input data set 912 having the same features 908" as the features 908 in the training data set 906 and the features 908' of the evaluation data set 910. The results of the prediction 914 are included in an output data set 916 consisting of predicted data. The machine learning model 902 can perform other operations, such as regression, classification, and others. As such, the example illustrated in FIG. 9 should not be construed as being limiting in any way.

Based on the foregoing, it should be appreciated that concepts and technologies for conditional temporary authentication for third party nodes have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A method comprising:
providing, by a first node of a plurality of nodes, a master authentication key to a second node of the plurality of nodes, wherein the first node and the second node are authenticated to each other, wherein the first node includes a plurality of node resources that have been divided into sectors, wherein the master authentication key comprises a main key field and a temporary key field, and wherein the temporary key field comprises a plurality of child key values that are replenished each time the first node and the second node authenticate to each other;
receiving, by the first node, from a third node of the plurality of nodes, a temporary child authentication key derived, by the second node, from the master authentication key provided to the second node by the first node based, at least in part, on a child key value of the plurality of child key values of the temporary key field, wherein the temporary child authentication key is derived by the second node in response to the second node receiving a resource request from the third node to access a node resource of the plurality of node resources of the first node;
processing, by the first node, the temporary child authentication key to determine a sector of the sectors of the first node where the node resource being requested is located to allow the third node access to the sector; and
providing, by the first node, the third node access to the sector where the node resource is located.

2. The method of claim 1, further comprising authenticating the second node with the first node, wherein providing, by the first node, the master authentication key to the second node comprises providing, by the first node, the master authentication key to the second node after authenticating the second node with the first node.

3. The method of claim 1, wherein the main key field comprises a main key string.

4. The method of claim 3, wherein the temporary child authentication key is derived by the second node from the master authentication key by performing a child key function between the main key string of the master authentication key and the child key value of the plurality of child key values of the temporary key field that corresponds with the node resource being requested, and wherein each of the plurality of child key values is used only once to create a respective temporary child authentication key.

5. The method of claim 4, further comprising sharing, between the first node and the second node, the child key function.

6. The method of claim 4, wherein the temporary child authentication key comprises a prefix and an output, and wherein the prefix identifies the temporary child authentication key to the first node.

7. The method of claim 6, further comprising determining, by the first node, based upon the prefix of the temporary child authentication key, that the second node provided the temporary child authentication key to the third node, wherein processing, by the first node, the temporary child authentication key to determine a sector of the sectors of the first node where the node resource being requested is located comprises reversing, by the first node, the child key function to determine the sector to allow the third node to access.

8. The method of claim 7, wherein the node resource comprises a hardware resource, a software resource, or a combination of hardware and software resources of the first node.

9. The method of claim 1, further comprising sectorizing, by the first node, the plurality of node resources into the sectors comprising the sector.

10. A computer-readable storage medium having computer-executable instructions stored thereon that, when executed by a processor of a first node of a plurality of nodes, cause the first node to perform operations comprising:
providing a master authentication key to a second node of the plurality of nodes, wherein the first node and the second node are authenticated to each other, wherein the first node includes a plurality of node resources that have been divided into sectors, wherein the master authentication key comprises a main key field and a temporary key field, and wherein the temporary key field comprises a plurality of child key values that are replenished each time the first node and the second node authenticate to each other;
receiving, from a third node of the plurality of nodes, a temporary child authentication key derived, by the second node, from the master authentication key provided to the second node by the first node based, at least in part, on a child key value of the plurality of child key values of the temporary key field, wherein the temporary child authentication key is derived by the second node in response to the second node receiving a resource request from the third node to access a node resource of the plurality of node resources of the first node;
processing the temporary child authentication key to determine a sector of the sectors of the first node where the node resource being requested is located to allow the third node access to the sector; and
providing the third node access to the sector where the node resource is located.

11. The computer-readable storage medium of claim 10, wherein the operations further comprise authenticating the second node with the first node, wherein providing the master authentication key to the second node comprises providing the master authentication key to the second node after authenticating the second node with the first node.

12. The computer-readable storage medium of claim 10, wherein the main key field comprises a main key string.

13. The computer-readable storage medium of claim 12, wherein the temporary child authentication key is derived by the second node from the master authentication key by performing a child key function between the main key string of the master authentication key and the child key value of the plurality of child key values of the temporary key field that corresponds with the node resource being requested, and wherein each of the plurality of child key values is used only once to create a respective temporary child authentication key.

14. The computer-readable storage medium of claim 13, wherein the operations further comprise sharing, between the first node and the second node, the child key function.

15. The computer-readable storage medium of claim 13, wherein the temporary child authentication key comprises a prefix and an output, and wherein the prefix identifies the temporary child authentication key to the first node.

16. The computer-readable storage medium of claim 15, wherein the operations further comprise determining, based upon the prefix of the temporary child authentication key, that the second node provided the temporary child authentication key to the third node, wherein processing the temporary child authentication key to determine a sector of the sectors of the first node where the node resource being requested is located comprises reversing the child key function to determine the sector to allow the third node to access.

17. The computer-readable storage medium of claim 16, wherein the node resource comprises a hardware resource, a software resource, or a combination of hardware and software resources, and wherein the operations further comprise sectorizing the plurality of node resources into the sectors comprising the sector.

18. A system comprising:
a plurality of nodes comprising a first node, a second node, and a third node; wherein the first node comprises a processor; and
a memory having computer-executable instructions stored thereon that, when executed by the processor, cause the first node to perform operations comprising
providing a master authentication key to the second node of the plurality of nodes, wherein the first node and the second node are authenticated to each other, wherein the first node includes a plurality of node resources that have been divided into sectors, wherein the master authentication key comprises a main key field and a temporary key field, and wherein the temporary key field comprises a plurality of child key values that are replenished each time the first node and the second node authenticate to each other,
receiving, from the third node of the plurality of nodes, a temporary child authentication key derived, by the second node, from the master authentication key provided to the second node by the first node based, at least in part, on a child key value of the plurality of child key values of the temporary key field, wherein the temporary child authentication key is derived by the second node in response to the second node receiving a resource request from the third node to access a node resource of the plurality of node resources of the first node,
processing the temporary child authentication key to determine a sector of the sectors of the first node where the node resource being requested is located to allow the third node access to the sector, and providing the third node access to the sector where the node resource is located.

19. The system of claim 18, wherein the operations further comprise authenticating the second node with the first node, and wherein providing the master authentication key to the second node comprises providing the master authentication key to the second node after authenticating the second node with the first node.

20. The system of claim 19, wherein the main key field comprises a main key string, wherein the temporary child authentication key is derived by the second node from the master authentication key by performing a child key function between the main key string of the master authentication key and the child key value of the plurality of child key values of the temporary key field that corresponds with the node resource being requested, and wherein each of the plurality of child key values is used only once to create a respective temporary child authentication key.

* * * * *